United States Patent
Kumar et al.

[11] Patent Number: 6,113,794
[45] Date of Patent: Sep. 5, 2000

[54] COMPOSITE SOLVENT RESISTANT NANOFILTRATION MEMBRANES

[76] Inventors: Ashwani Kumar, 1759 Cara Crescent, Orleans, Canada, K4A 1M8; Deepak Musale, 550 Langs Road, Apt. #508, Ottawa, Ontario, Canada, K1K 4C2

[21] Appl. No.: 09/236,519

[22] Filed: Jan. 25, 1999

[51] Int. Cl.[7] .......................... B01D 69/12; B01D 71/58
[52] U.S. Cl. ................ 210/650; 210/490; 210/500.27; 210/500.42; 264/41; 427/246
[58] Field of Search .............................. 210/490, 500.29, 210/500.37, 500.38, 500.39, 500.43, 650, 654, 500.23, 500.27, 500.42; 427/245, 246; 264/41, 45.1, 49

[56] References Cited

U.S. PATENT DOCUMENTS

| | | | |
|---|---|---|---|
| 5,032,282 | 7/1991 | Linder et al. | 210/500.43 |
| 5,039,421 | 8/1991 | Linder et al. | 210/500.43 |
| 5,505,859 | 4/1996 | Dunweg et al. | 210/500.29 |

*Primary Examiner*—Joseph W. Drodge
*Attorney, Agent, or Firm*—J. Wayne Anderson

[57] ABSTRACT

The invention disclosed relates to a nanofiltration composite membrane that is solvent and pH stable and may be used to separate at least one dissolved or suspended component from a liquid phase, including (a) a substrate ultrafiltration membrane formed from an ethylenically unsaturated nitrile, such as acrylonitrile and substituted acrylonitrile polymers, and (b) a coating of a hydrophilic polymer containing reactive functional groups.

Preferably, the reactive functional groups described in (b) are subjected to a post-coating cross-linking reaction with a substantially non-cytotoxic cross-linking agent such as bi-functional aldehydes. A method for the preparation of such composite membranes is also disclosed.

20 Claims, No Drawings

COMPOSITE SOLVENT RESISTANT NANOFILTRATION MEMBRANES

FIELD OF THE INVENTION

The present invention relates to solvent and pH stable nanofiltration composite membranes and to a method for preparing same.

BACKGROUND OF THE INVENTION

Nanofiltration (NF) membranes are often made from polymeric materials, which generally swell and dissolve, in organic solvents. The swelling of such membranes in presence of solvents and under pressure usually results in compaction, and loss of flux and performance. The potential applications of solvent stable membranes are in the areas of food technology, biotechnology, the treatment of waste streams, chemical process and petrochemical industry. One particular advantage of solvent stable membranes would be that they could be exposed to a variety of solvent media including aqueous solutions, suspensions or emulsions, as well as to organic solvents that contain solutes. These solvent stable membranes are presently available in the form of ceramics or other inorganic materials and specialized crosslinked polymers such as epoxy polyimide type polymers. These products are expensive, generally not available in the nanofiltration range and are restricted to certain configurations. Crosslinked polyimides supplied by NITTO (Japan) have some solvent resistance but are limited to the UF range.

In general, there are many references that employ polyacrylonitrile (PAN), substituted PAN or PAN co-polymers as a substrate UF membrane. In most cases, PAN is modified e.g. by crosslinking or by hydrophilization.

Many of these references also include at least one additional layer, which is often cross-linked in situ, and involve a plurality of method steps.

For example, Nawawi and Huang[1], generally discloses composite chitosan based membranes made by forming a substrate membrane by casting a solution of the polymer onto a plate to form a porous membrane film, coating chitosan on the substrate membrane and cross-linking the chitosan in situ.

The use disclosed for this composite membrane is for pervaporation (PV) of feed with high isopropanol content. It is noted that pervaporation is quite different from nanofiltration. Pervaporatioin is carried out at reduced pressure, while nanofiltration is effected at positive pressure and the fluxes are orders of magnitude higher. Additionally, selective layer in a PV membrane is dense while it is porous in a NF membrane.

The reference also discloses the use of only polysulfone as the polymer for substrate membrane and hexamethylene diisocynate (HMDI) as the cross-linking agent. Notably, this cross-linker is cytotoxic. It is interesting to note that the concentrations of HMDI and glutaraldehyde required for killing 50% test animals after a 4 h inhalation period were 0.31 and 5000 ppm, respectively. It is obvious that the toxicity of HMDI is significantly greater than glutaraldehyde.

Also, it is emphasized that the concentration of chitosan used is low i.e. 0.5%/w. This results in a low viscosity of coating solution and the formation of a dense thin film. At higher concentrations of chitosan, a porous layer is formed.

Further, in Wang et al.[2], a composite chitosan membrane is disclosed wherein the microporous substrate membrane is PAN and the top layer is chitosan. It is noted that the PAN is hydrolyzed with NaOH. Cross-linking between the PAN and chitosan layers also includes a middle intermolecular layer.

The hydrolysis of the surface of the PAN is to facilitate the reaction of PAN and chitosan, so that tighter bonding between the two layers will occur.

The use disclosed is also for the pervaporation of alcohol.

In U.S. Pat. No. 4,985,138, which was issued on Jan. 15, 1991 to M. Pasternak, the substrate layer is PAN and the coating layer is PEI, cross-linked in situ by urea or amide linkages e.g. a polyisocyante or a poly (carbonylchloride).

Specifically, the composite membrane includes a substrate of a homo- or co-polymer of PAN, which is cross-linked, and a coating of an ionically charged hydrophilic, cross-linked polymer. An additional intermediate coating layer is also present.

Also, in U.S. Pat. Nos. 5,032,282 and 5,039,421 of Linder et al., composite membranes are disclosed which include plural coatings and method steps as well as expensive processing chemicals.

SUMMARY OF THE INVENTION

It is an object of the present invention to provide composite NF membranes, which are solvent, and pH stable i.e. do not dissolve, and preferably also do not swell in organic solvents.

It is another object of the invention to provide such membranes that are solvent resistant, show improved stability below pH 7 and have a broad temperature stability.

It is a further object to provide such membranes which are relatively economical to manufacture and which can be made in a desired configuration such as plate-frame, tubular, hollow fiber or spiral wound.

According to one aspect of the invention, a composite nanofiltration membrane is provided which comprises:

a substrate ultrafiltration membrane formed from an ethylenically unsaturated nitrile polymer, such as polyacrylonitrile and substituted polyacrylonitrile, and a porous coating of a hydrophilic polymer containing reactive functional groups formed from an aqueous solution of the polymer containing 1.5–2.5% w/w of the polymer.

Preferably, the reactive functional groups of the hydrophilic polymer are cross-linked.

According to another embodiment of the invention, a method is provided for making a composite nanofiltration membrane, comprising (a) providing a solution of an ethylenically unsaturated nitrile polymer in an organic solvent, (b) casting the solution onto a support to form a UF membrane substrate, and (c) coating the UF membrane substrate with an aqueous solution of a hydrophilic polymer containing reactive functional groups, the concentration of the polymer in solution being 1.5–2.5% w/w, and a weak acid or a buffer containing a weak acid and its corresponding salt, to adjust the pH to 3–5.

Preferably included is the additional step of (d) cross-linking the reactive functional groups of the hydrophilic polymer in situ with a cross-linking agent e.g. at 20–40° C., for 20–120 minutes, the cross-linking agent being substantially non-cytotoxic and selected to provide chemical stability and pH stability below pH 7.

The present invention also includes a method for separating at least one dissolved or suspended solid component from a liquid phase, which comprises contacting the liquid phase under an applied pressure greater than the osmotic pressure with the composite Membrane according to the invention, and thereafter recovering the dissolved or suspended component.

This method may be applied to the separation of monovalent inorganic salts from at least one organic compound e.g. of molecular weight in the range 200–1500, preferably in the range of 200–600, in aqueous or non-aqueous media. In general, the process may be applied for the separation from aqueous media of monosaccharides, disaccharides or polysaccharides. The process may also be applied to the separation of insoluble particles, colloidal particles, soluble polymers and other solute molecules from an organic solvent, e.g. from alcohols, ketones, esters and to the concentration of organic or inorganic solutes from aqueous streams, water/organic solvent mixtures, or organic solvents alone. The composite membranes may also be used for recycling solvents used in the chemical process industry for purification, extraction and crystallization of fine chemicals.

DETAILED DESCRIPTION OF THE PREFERRED EMBODIMENTS

The substrate membrane may be supported on a porous support, such as those fabricated from non-woven or woven cellulosics, polyethylene, polyesters such as polyethylene terephthalate, polytetrafluoroethylene, glass fibers, porous carbon, graphite, inorganic supports based on alumina and/or silica. The substrate membrane may be fabricated into any desired shape, e.g. a hollow fiber, flat sheet or tubular.

Coating on the substrate membrane may be carried out by immersion, spraying or casting a coating solution. The final thickness of the coating may, for example, lie within the range of from about 1 to about 500 nm.

Thus, the polymer or its derivatives may be dissolved in a suitable organic solvent or solvent mixture [e.g. N-Methyl pyrrolidinone (NMP), N,N-Dimethyl formamide (DMF), Dimethyl sulfoxide (DMSO), N,N-dimethylacetamide (DMA)], which may or may not contain cosolvents, nonsolvents, salts, surfactants or electrolytes, for altering or modifying the membrane morphology and its flux and rejection properties (e.g. acetone, ethanol, methanol, formamide, water, sodium dodecyl sulfate, divalent salts such as zinc chloride, calcium chloride, magnesium perchlorate and monovalent salts such as lithium nitrate, lithium chloride). The casting solution may be filtered by any of the known processes (e.g. pressure filtration through microporous filters, or by centrifugation). It is then cast onto a non-woven or woven porous substrate selected from cellulosics, polyethylene, polyesters such as polyethylene terephthalate, polytetrafluoroethylene, glass fibers, porous carbon, graphite, inorganic supports based on alumina and/or silica. The membrane may also be formed as a hollow fiber or tubelet which does not require a support for practical use; or the support may be of such shape, and the membrane is cast internally thereon. The concentration of polymer in the casting solution may vary as a function of its molecular weight (MW) and additives, and may be for example, within the range of about 5–25% w/w, preferably about 10–20% w/w. The casting solution temperature may vary from about 10–60° C., preferably about 20–40° C., depending on the particular polymer, its molecular weight, the cosolvents and additives in the casting solution.

The casting solution may be applied to the above-mentioned supports or porous substrates by any of the well-known techniques of casting. The wet film thickness may lie within the range of 100–400 $\mu$m, preferably 150–250 $\mu$m for flat sheet membranes; tubular membranes may have thicker walls. The cast film of polymer solution may be immersed immediately, or after a partial drying for 5 seconds to 5 minutes under ambient conditions or at elevated temperature, in a gelation bath of a non-solvent. Non-solvent bath may comprise water, to which there may optionally be added a small percentage of a solvent and/or surfactant (e.g. sodium dodecyl sulfate). The bath temperature may be maintained at 0–40° C., preferably at 15–25° C. Thus membranes having a thickness of 50–300 $\mu$m, preferably of 50–150 $\mu$m can be formed. Instead of polyacrylonitrile itself, substituted polyacrylonitriles, e.g. $C_1$–$C_6$ alkylacrylonitriles such as methacrylonitrile and hexylacrylonitrile polymers may alternatively be used as membrane forming material.

The substrate membrane is then coated with an aqueous solution of a polymer selected from hydrophilic polyfunctional oligomers or polymers containing active hydrogen atoms bound to oxygen or nitrogen atoms. The pH of this solution is adjusted to 3–5, by means of a weak acid or a buffer containing a weak acid and its corresponding salt. The examples of such hydrophilic polymers include polymers with amino groups such as chitosan and its derivatives with degree of deacetylation ranging from 70–100 and molecular weights ranging between 20,000–2,000,000, preferably between 50,000–150,000.

The coating solution may have a polymer concentration in the range of 1.5–2.5% w/w, preferably in the range of 2–2.5% w/w. Weak acids including carboxylic acids such as acetic acid, citric acid, lactic acid or the buffer of these acids with their salts e.g. sodium acetate, may be used as solvents. The wet coating layer thickness may be in the range of 50–300 $\mu$m, preferably in the range of 50–150 $\mu$m. Note that the wet thickness is different than the final dry thickness of the coating layer. These coated membranes are then dried at 25–70° C., preferably at 30–50° C. for 10–30 h, preferably 20–25 h.

When the polymer is chitosan, for reaction with the cross-linking agent, these coated and dried membranes are treated with alkaline solutions such as that of KOH or NaOH in the concentration range of 1–5%, preferably 2–4% for converting chitosan salt to chitosan. In the case of other polymers e.g. polyethyleneimine, which already have primary amine groups available for reaction, the further step of reacting with an alkaline solution is not required. However, for chitosan, we have to regenerate a primary amine group, which otherwise is in protonated form in the acidic solvent, for reacting with the cross-linking agent.

These composite membranes are then surface crosslinked with a substantially non-cytotoxic ionic, polar or hydrophobic cross-linking agent, selected to provide improved stability of membranes below pH 7. The cross-linking agent may be included in aqueous or nonaqueous solvents and in some cases may be incorporated in the coating solution itself. The crosslinking agent may be monofunctional or polyfunctional. The polyfunctional crosslinking agent is particularly capable of creating bonds with the reactive functional groups of the coated material. Such crosslinking agents possess their reactivity by virtue of the presence of reactive multiple bonds, and/or epoxide, aziridine, aldehyde, isocyanate, isothiocyanate, carboxylic anhydride, acyl halide, carbonic imide halide and N-methylol groups.

Examples of such bi-functional cross-linking agents include glutaraldehyde, adipaldehyde, and sulfuric acid, while mono-functional agents include formaldehyde, and epichlorohydrin. The concentration of crosslinking agent may be between 0.01–1% w/w and the crosslinking time may be in the range of 20–120 minutes. The crosslinking may be accomplished by immersing the coated, dried and alkali treated membranes in a solution of the crosslinker at 20–60° C., preferably at 20–40° C.

The preparation and characteristics of such composite membranes are illustrated in following examples.

EXAMPLE 1

Polyacrylonitrile (Polysciences Inc., USA), MW 150,000, was dissolved in DMF and was cast onto a moving non-woven polyester and gelled in reverse osmosis (RO) water at 25° C. After washing overnight with water, the substrate membrane showed 38% rejection for polyethylene oxide (MW 100 kDa) and pure water flux of 200 liters per square meters per hour (LMH) at 200 kPa. It was then coated with 2.5% w/w Chitosan solution (in 0.3 M acetic acid/0.2 M sodium acetate buffer) using a glass rod and dried at 50° C. for 24 h in a convection oven. These coated and dried membranes were then treated with 4% w/v aqueous sodium hydroxide to convert Chitosan acetate to Chitosan. The postcoating crosslinking was carried out by immersing these composite membranes in aqueous solution of glutaraldehyde (0.02% w/w) at 25° C. for 30 minutes. These membranes after washing several times with water exhibited pure water flux of 17 LMH at 480 kPa and MWCO of 700 Daltons. The observed rejections for salts and sugars for these membranes are shown in Table 1.

TABLE 1

Observed rejections for salts and sugars

| Solute | Observed rejection (%) |
| --- | --- |
| NaCl | 15.4 |
| MgSO$_4$ | 64.9 |
| Fructose | 24.9 |
| Sucrose | 56.1 |
| Raffinose | 77.1 |

EXAMPLE 2

The composite membrane was prepared similar to Example 1 and post-coating crosslinking was carried out in 0.08% w/w glutaraldehyde solution for 30 minutes. After washing with water, this membrane showed pure water flux of 8.3 LMH at 480 kPa and MWCO of about 550 Daltons. The observed rejections for salts and sugars are shown in Table 2.

TABLE 2

Observed rejections for salts and sugars

| Solute | Observed rejection (%) |
| --- | --- |
| NaCl | 19.2 |
| MgSO$_4$ | 60.9 |
| Fructose | 31.8 |
| Sucrose | 58.9 |
| Raffinose | 78.1 |

The solvent permeation data were collected at an inlet pressure of 830 kPa and a cross flow velocity of 1.2 m/s as shown in Table 3.

TABLE 3

Solvent permeation data

| Solvent | Permeate flux (LMH) | % change in flux after 2h operation |
| --- | --- | --- |
| Methanol | 9.2 | 2.1 |
| Ethanol | 2.5 | 7.3 |
| Iso-propanol | 1.0 | 1.0 |
| Methyl Ethyl Ketone | 2.0 | −13.9 |
| Ethyl Acetate | 2.0 | 12.0 |
| Hexane | No Flux | — |

EXAMPLE 3

The composite membranes were prepared similar to Example 1. In this case the postcoating crosslinking was carried out using 0.2% glutaraldehyde solution for 30 minutes. These membranes after washing several times with water showed the pure water flux of 8.3 LMH at 480 kPa and MWCO of 500 Daltons. The rejections for salts and sugars are shown in Table 4.

TABLE 4

Observed rejections for salts and sugars

| Solute | Observed rejection (%) |
| --- | --- |
| NaCl | 25.5 |
| MgSO$_4$ | 72.8 |
| Fructose | 45.5 |
| Sucrose | 72.6 |
| Raffinose | 85.7 |

The solvent permeation data were collected at an inlet pressure of 830 kPa and a cross flow velocity of 1.2 m/s as shown in Table 5.

TABLE 5

Solvent permeation data

| Solvent | Permeate flux (LMH) | % change in flux after 2h operation |
| --- | --- | --- |
| Methanol | 7.6 | 2.8 |
| Ethanol | 2.6 | 6.2 |
| Iso-propanol | 0.8 | −1.7 |
| Methyl Ethyl Ketone | 2.5 | −4.0 |
| Ethyl Acetate | 3.1 | −3.6 |
| Hexane | No Flux | — |

EXAMPLE 4

The composite membranes were prepared similar to Example 2. In this case the postcoating crosslinking was carried out for 60 minutes. These membranes after washing several times with water showed the pure water flux of 9 LMH at 480 kPa and MWCO of 1000 Daltons. The observed rejections for salts and sugars are shown in Table 6.

TABLE 6

Observed rejections for salts and sugars

| Solute | Observed rejection (%) |
|---|---|
| NaCl | 24.0 |
| MgSO$_4$ | 58.0 |
| Fructose | 42.2 |
| Sucrose | 61.5 |
| Raffinose | 80.1 |

EXAMPLE 5

The composite membranes were prepared similar to Example 2. In this case the postcoating crosslinking was carried similar to that in Example 4 at glutaraldehyde concentration of 0.2% w/w. These membranes after washing several times with water showed the pure water flux of 6.3 LMH at 480 kPa and MWCO of 400 Daltons. The observed rejections for salts and sugars are shown in Table 7.

TABLE 7

Observed rejections for salts and sugars

| Solute | Observed rejection (%) |
|---|---|
| NaCl | 27.8 |
| MgSO$_4$ | 87.7 |
| Fructose | 53.8 |
| Sucrose | 85.5 |
| Raffinose | 85.7 |

The solvent permeation data were collected at an inlet pressure of 820 kPa and a cross flow velocity of 1.2 m/s as shown in Table 8.

TABLE 8

Solvent permeation data

| Solvent | Permeate flux (LMH) | % change in flux after 2h operation |
|---|---|---|
| Methanol | 7.3 | −1.8 |
| Ethanol | 1.7 | 0.6 |
| Iso-propanol | 0.5 | −13.0 |
| Methyl Ethyl Ketone | 1.7 | 0.2 |
| Ethyl Acetate | 1.0 | 16.9 |
| Hexane | No Flux | — |

EXAMPLE 6

The composite membranes were prepared similar to Example 2. In this case the postcoating crosslinking was carried similar to that in Example 4 at glutaraldehyde concentration of 0.5% w/w. These membranes after washing several times with water showed the pure water flux of 6.5 LMH at 480 kPa and MWCO of 900 Daltons. The observed rejections for salts and sugars are shown in Table 9.

TABLE 9

Observed rejections for salts and sugars

| Solute | Observed rejection (%) |
|---|---|
| NaCl | 29.1 |
| MgSO$_4$ | 81.7 |
| Fructose | 58.8 |
| Sucrose | 84.7 |
| Raffinose | 91.3 |

EXAMPLE 7

The composite membranes were prepared similar to Examples 1–6. These membranes were immersed in different organic solvents for 24 h, water flux was then measured at 200 kPa and 600 rpm and compared with the initial water flux measured under similar experimental conditions before solvent treatment. The % change in pure water flux due to solvent treatment is shown in Table 10.

TABLE 10

Change in pure water flux due to solvent treatment

| Solvent | % change in pure water flux |
|---|---|
| Ethanol | −2.3 |
| Iso-propanol | ±9.0 |
| Methyl Ethyl Ketone | ±3.5 |
| Ethyl Acetate | −13 |
| Hexane | ±4.6 |

We claim:

1. A nanofiltration composite membrane comprising a substrate ultrafiltration membrane formed from non-cross-linked ethylenically unsaturated nitrile polymer, and a porous coating of a cross-linked hydrophilic polymer having a molecular weight of 20,000 to 2,000,000 and containing reactive functional groups, formed from an aqueous solution of the polymer containing 1.5–2.5% w/w of the polymer.

2. A composite membrane according to claim 1, wherein the hydrophilic polymer is a polyfunctional polymer containing active hydrogen atoms bound to oxygen or nitrogen atoms.

3. A composite membrane according to claim 2, wherein the final thickness of the hydrophilic polymer coating is in the range of 1–500 nm.

4. A composite membrane according to claim 3, wherein the substrate membrane is configured in a form selected from the croup consisting of a flat sheet, tubular, hollow fiber and spiral.

5. A composite membrane according to claim 4, wherein the unsaturated nitrile polymer is polyacrylonitrile, and the hydrophilic polymer is chitosan.

6. A composite membrane according to claim 5, wherein the aqueous solution contains 2–2.5% w/w of chitosan.

7. A composite membrane according to claim 5, wherein the molecular weight of chitosan is 50,00 to 150,000.

8. A method for separating a dissolved or suspended solid component from a liquid phase, comprising contacting the liquid phase under an applied pressure greater than osmotic pressure, with a composite nanofiltration membrane according to claim 1, and thereafter recovering the dissolved or suspended component.

9. A method according to claim 8, wherein the liquid phase is aqueous or non-aqueous.

10. A method according to claim 9, wherein the substrate membrane is configured in a form selected from the group consisting of a flat sheet, tubular and hollow fibres, and wherein membrane modules of a type selected from the group consisting of including plate and frame, tubular, spirals and hollow fibres are made from one of the configurations.

11. A composite membrane according to claim 1, wherein the hydrophilic polymer includes amino groups, and has a degree of deacetylation of 70–100%.

12. A method for making a nanofiltration membrane, comprising
(a) providing a solution of a non-cross-linked ethylenically unsaturated nitrile polymer in an organic solvent,
(b) casting the solution onto a support to form a UF membrane substrate,
(c) coating the UF membrane substrate with an aqueous solution of a hydrophilic polymer having a molecular weight of 20,000 to 2,000,000 and containing reactive functional groups, the concentration of the polymer in solution in step (c) being 1,5–2.5% w/w, and
(d) cross-linking the reactive functional groups of the hydrophilic polymer in situ, wherein the cross-linking is effected by a substantially non-cytotoxic cross-linking agent selected to provide chemical stability and pH stability below pH 7.

13. A method according to claim 12, wherein the hydrophilic polymer is a polyfunctional polymer containing active hydrogen atoms bound to oxygen or nitrogen atoms.

14. A method according to claim 13, wherein the final thickness of the hydrophilic polymer coating is in the range of 1–500 nm.

15. A method according to claim 14, wherein in step (c), the aqueous solution is acidified with a weak acid, or a buffer containing a weak acid and its corresponding salt.

16. A method according to claim 15, wherein in step (d), the cross-linking is effected at 20–40° C., for 20–120 minutes.

17. A method according to claim 16, wherein in step (a), the organic solvent is selected from the group consisting of NMP, DMF DMSO, DMA and mixtures thereof, and wherein the amount of polymer in solution in step (a) is in the range of 5–25% w/w.

18. A method according to claim 17, wherein the cross-linking agent is a bi-functional aldehyde.

19. A method according to claim 18, wherein the substrate is polyacrylonitrile and wherein the cross-linking agent is glutaraldehyde.

20. A method according to claim 19, wherein the hydrophilic polymer is chitosan, including between steps (c) and (d), the additional steps of drying and treating the membrane with an alkaline solution.

* * * * *